United States Patent [19]

Davis

[11] Patent Number: 5,035,567

[45] Date of Patent: Jul. 30, 1991

[54] UNLOADER FOR TIRE BUILDING SYSTEM

[75] Inventor: Paul J. Davis, Findlay, Ohio

[73] Assignee: Cooper Tire & Rubber Company, Findlay, Ohio

[21] Appl. No.: 529,073

[22] Filed: May 25, 1990

[51] Int. Cl.$^5$ .............................................. B65G 47/00
[52] U.S. Cl. ................................ 414/751; 156/406.2; 198/468.2; 198/535
[58] Field of Search ................................ 414/751, 225; 198/468.2, 535, 536; 156/406.2, 396

[56] References Cited

U.S. PATENT DOCUMENTS 3,151,013  9/1964  Nebout ........................... 156/406.2
4,584,049  4/1986  Mukae et al. ................ 156/406.2 X Primary Examiner—Robert J. Spar
Assistant Examiner—Donald W. Underwood
Attorney, Agent, or Firm—Joseph G. Nauman

[57] ABSTRACT

A completed green tire is automatically released from a tire assembly drum and transported by automated holders to a discharge station, where an unloading track is positioned beneath the green tire. The holders include grips at the ends of reciprocable arms, arranged so the grips engage the periphery of the green tire at diametrically opposite points, which are on a line rotated somewhat from vertical with the bottom of such line away from the unloading track. Thus as the grips release the green tire, it rolls by gravity on its circular periphery onto the track mechanism, and passes to a discharge conveying system which can take the complete green tires to a vulcanizing and molding operation.

5 Claims, 2 Drawing Sheets

UNLOADER FOR TIRE BUILDING SYSTEM

This application relates to automated tire building systems and apparatus and methods therefore. In the past, once a green tire is assembled, ready for molding and vulcanizing, whether by single stage or two stage methods, little attention has been given to the unloading of the completed green tire. In general, the operator (tire builder) removed the green tire manually from the final assembly drum and placed it at a collection station, on some sort of conveyor.

With the advent of more sophisticated, and faster, tire making systems, it has been noted that this task, if performed manually, interferes unnecessarily with the builder's efficiency, and he may perform his overall tasks more smoothly if he is relieved of the dismounting/unloading chore. It is with this objective in mind that the present invention provides a mechanism, and a method, for such dismounting/unloading of completed green tires in various forms of automated, and semi-automated, tire building systems.

SUMMARY OF THE INVENTION

In a two stage tire building system, the belttread stock assembly is built on an adjustable building drum, and the completed assembly is then carried by a transfer ring mechanism into position coaxially surrounding a carcass which has been expanded into a generally toroidal shape. The carcass is further inflated to bring it into contact with the interior of the belt-tread stock assembly, and with the transfer ring withdrawn, the two assemblies are stitched together, completing the construction of a green tire. The majority of the foregoing work is performed with minimum operator attention or help.

According to the invention, the completed green tire is automatically released from the tire assembly drum and transported by automated holders to a unloading station, where a discharge or unloading track is positioned beneath the green tire. The holders include grips arranged so they engage the periphery of the green tire at diametrically opposite points, which are on a line rotated somewhat from vertical with its bottom away from the track. Thus as these arms release the green tire, it rolls by gravity on its circular periphery onto and down the track mechanism, and passes to a discharge conveying system which can take the complete green tires to a vulcanizing and molding operation.

The primary object of the invention is to provide a method and apparatus for automated unloading of green tires form a tire building system; to provide such a method and apparatus wherein the green tire is taken from the tire assembly drum by gripping members, carried to an unloading station, and released with a rolling motion onto a track which leads away from the machine; to provide such a system which employs direct straight line motions in the unloading method, and uses the weight of the green tire itself to propel it down an unloading track; and to provide mechanism which can be programmed to handle different sizes of green tires, to move them accurately and with little power, and to operate efficiently so as not to impede the production rate of the tire building system.

Other objects and advantages of the invention will be apparent from the following description, the accompanying drawings and the appended claims.

DESCRIPTION OF PREFERRED EMBODIMENT

The invention relates to a novel method and apparatus for unloading completed green tires from a tire building system. The invention is useful in systems such as disclosed in U.S. Pat. Nos. 4,402,782 and 4,469,546, and is also useful particularly in connection with a more elaborate two stage tire building system such as disclosed in copending U.S. Pat. application Ser. No. 529,080, filed on even date with this application, or in connection with a novel tire assembly drum as disclosed in U.S. Pat. application Ser. No. 529,037, also filed on even date with this application. The disclosures of said copending applications are incorporated herein by reference to simplify the explanation of the invention.

GENERAL LAYOUT

Figure 1:
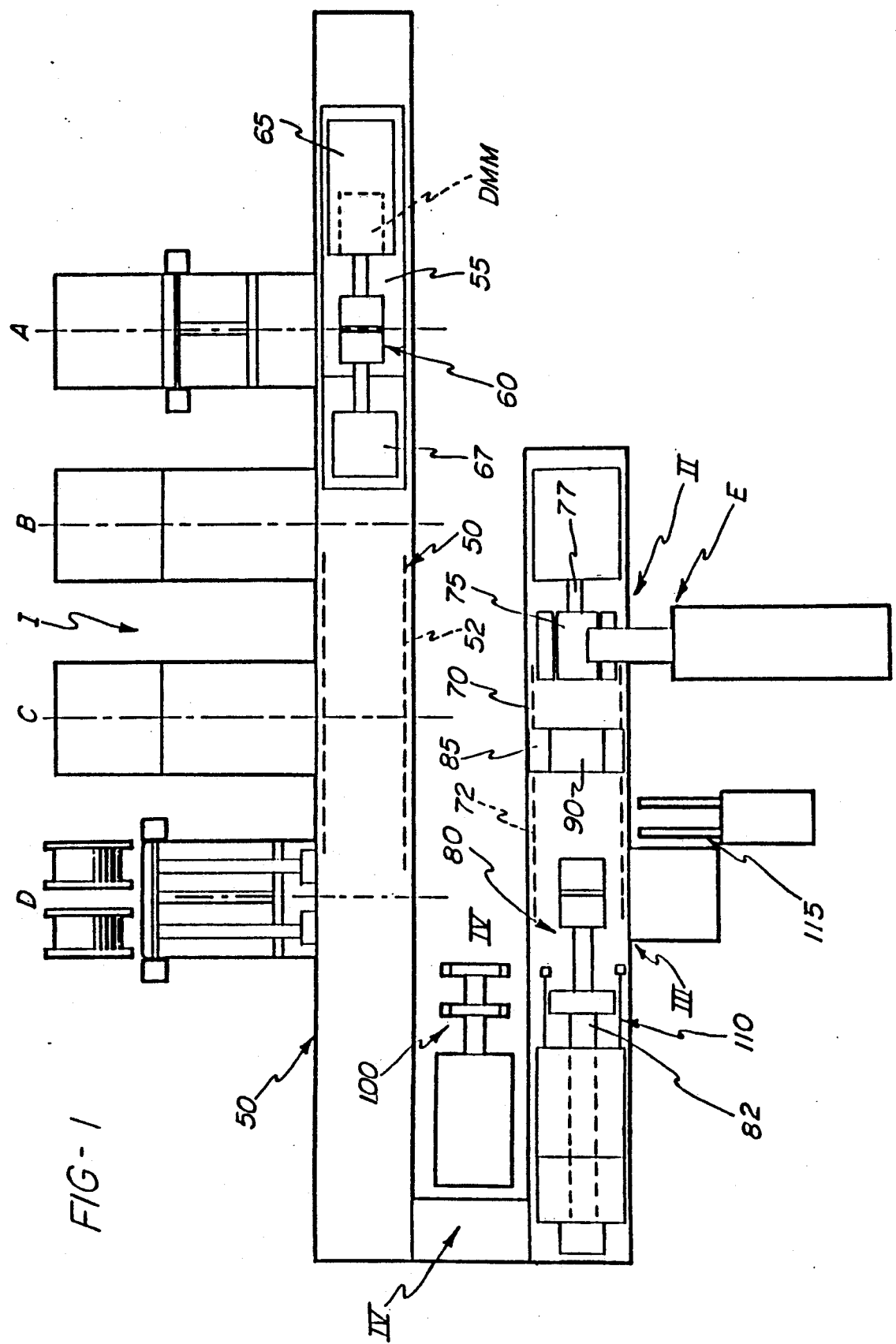
FIG. 1 is a schematic plan view of the system.

FIG. 1 is a floor plan of the two stage tire building system, which includes on one side a novel carcass building section I, on the other side a belt and tread stock building section II together with the green tire building section III, and between sections I and III a carcass carrying and transfer section IV, which unloads a completed carcass from section I and places it in the tire building section III. The carcass building section I includes a bed 50 having a track or way 52 for a carriage 55 that supports a carcass building drum 60 and its associated headstock 65 and tailstock 67, along with bead ring placers as shown and described in said application Ser. No. 529,080 for this building drum 60. Track 52 defines a carcass building path and along the track is a plurality of stations A, B, C, and D which function as innerliner, ply and sidewall servers. It should be understood that additional ply servers may be added, as between stations C and D.

In operation, carriage 55 is moved under program control into alignment with the center of ply material or sidewall material at the various stations. Circular beads or hoops combined with a filler are set on bead placers 70 which are associated with drum 60, and predetermined lengths of ply materials are likewise placed on and assembled around the drum, all in a desired sequence, and the edges of at least some plies are turned over the beads, producing a completed tire carcass hereinafter referred to as the first stage carcass assembly, and as shown in said copending application Ser. No. 529,080.

Sections II and III preferably are supported on a common second bed 70 having another track or way 72 extending in spaced relation to the first track 52, preferably parallel thereto. At one end of the second track 72 there is a belt/tread stock building drum 75 (sometimes called a belt building drum), supported on a rotatable shaft 77 with its axis of rotation extending parallel to second track 72. Adjacent the belt building drum there is a belt server E which can supply one or more belt components to the belt building drum 75, and a tread stock server (below server E) which can supply a length of tread stock to the belt building drum. At the other end of second track 72 there is a flangeless tire building or assembly drum 80, comprising two drum halves rotatably supported on a second shaft 82 with its axis parallel to track 72 and precisely in line with the axis of belt building drum 75. A carriage 85 is supported for movement between the drums 75 and 80 along track 72, and on carriage 85 is a transfer ring 90 which can engage and remove a completed belt/tread stock assembly from belt building drum 75 and move such assembly over and around a carcass which has been placed on tire building drum 80, to be manipulated into a toroidal shape.

Between the two tracks 52 and 72, the transfer section IV includes a carcass transfer robot 100 which functions to remove a first stage tire carcass from the carcass building drum 60 and position carcass onto the tire building drum 80, where the carcass is transformed into the desired toroidal shape, as part of the application of a belt/tread stock assembly to that carcass. The two assemblies are then stitched together to produce a green tire GT. Once the green tire is completed, an unloading mechanism 110 (which is the feature invention of this application) associated with the tire building drum engages the tire, then moves the tire to a discharge chute assembly 115 and releases the tire, from whence the tire is taken to a vulcanizing press for final curing.

The transfer ring 90 is supported on its carriage 85 so as to traverse between a belt/tread building drum 75 and green tire assembly drum 80, along track 72. Details of construction of this ring are disclosed in U.S. Pat. No. 4,402,782. The ring preferably is located for movement between the drums with the center of this ring coaxial with the axes of rotation of both these drums, and the ring is supported on carriage 85 (which is suitably power driven) to move between three distinct positions. Within the ring there are a plurality of retaining shoes which can be projected inward to contact the outer surface of the belt/tread stock assembly, as shown in said application Ser. No. 528,080. As the transfer ring is moved into its pick-up position around the belt/tread stock building drum 75, the transfer shoes extend inward, and drum 75 is collapsed sufficiently to transfer support of the assembly to ring 90. Carriage 85 is then driven into its second position around the green tire assembly drum 80, on which a carcass has already been placed.

The carcass is inflated, as previously explained transfer ring 90 releases from the exterior of the belt-tread stock package and moves away, and the stitching mechanism including wheels mounted on accurately movable arms and the driving drum come into play as explained in U.S. Pat. Nos. 4,402,782 and 4,306,931 to stitch the belt/tread stock subassembly to the now shaped carcass, resulting in a completed green tire GT still supported on tire building drum 80.

GREEN TIRE DISCHARGE

Figure 2:
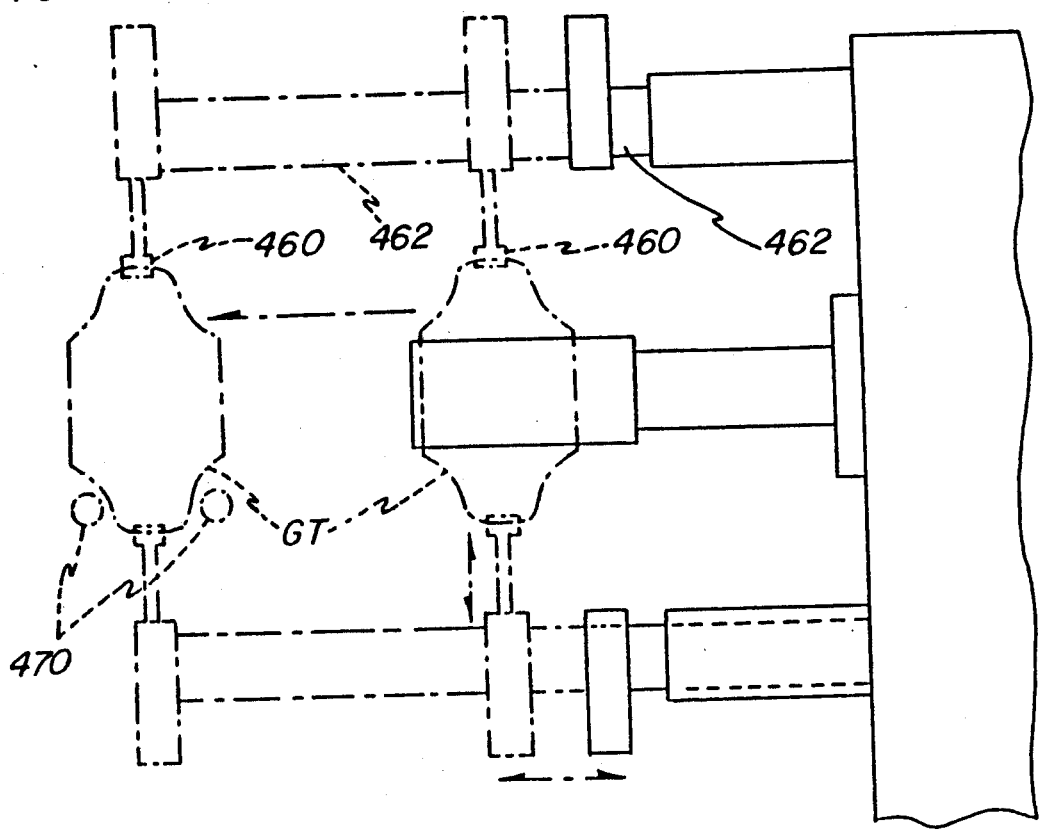
FIG. 2 is a schematic view of the unloading mechanism, and its function, for unloading a green tire from the second stage tire building drum.

The completed green tire GT is engaged by a pair of transfer pads 460 (FIGS. 2 and 3) which are on the ends of transfer arms 462, extending from the headstock of the tire building drum 80. Arms 462 are movable from a retracted position (full lines, FIG. 2) to a pick-up position at which the pads are initially outward of the green tire GT still on the drum 80. The transfer pads are extended inward from the arms, as shown in FIG. 3, and function as grips to engage the periphery of the green tire GT, along a line which is slightly rotated from vertical (see FIG. 3).

The pads and seal rings of tire building drum 80 are retracted by relieving the air pressure which has been keeping them radially extended. The green tire is freed of tire building drum 80, and is carried forward by extension of transfer arms 462 to convey the green tire GT to the discharge station at chute 115; this is the left-most extension of the arms, as shown in phantom lines in FIG. 2.

Figure 3:
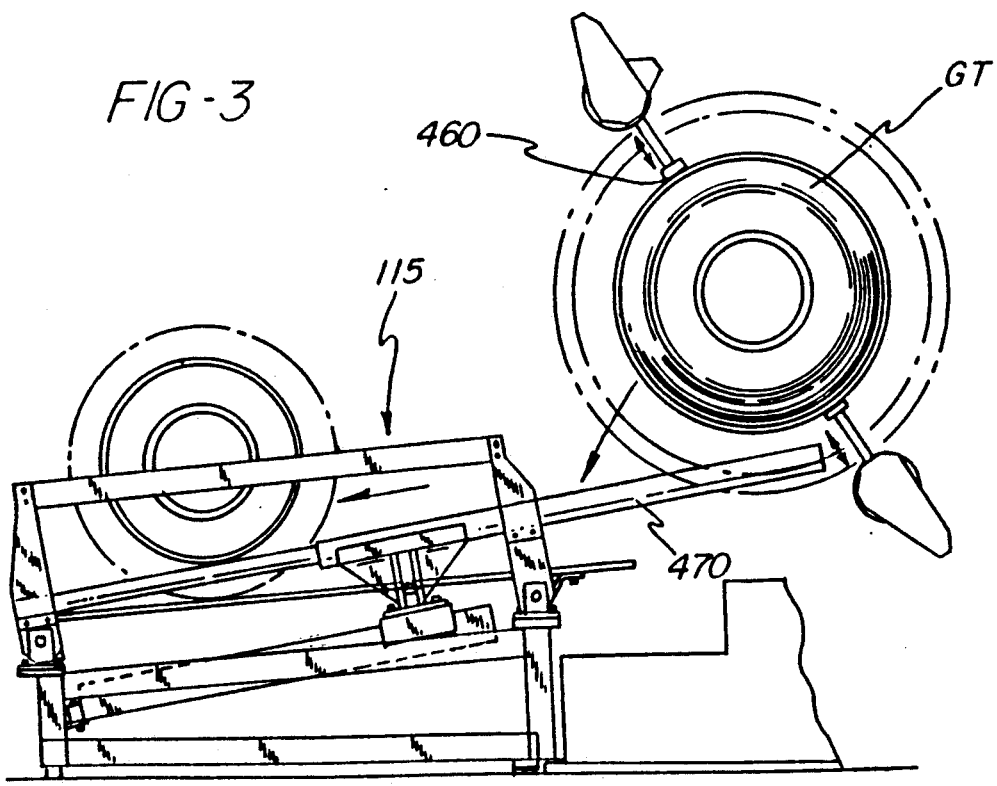
FIG. 3 is a side view of the unloading mechanism together with the novel discharge chute for the completed green tires.

At the discharge station there are a pair of guide tracks 470 which are movable, supported to reciprocate between a waiting location, to one side of the path of motion of transfer ring 90 and its carriage 85, and a receiving location wherein the tracks extend beneath the green tire GT as shown in FIG. 3. When the transfer pads 460 are withdrawn from the green tire GT, it drops slightly onto these tracks. The location of the transfer pads or grips is circularly offset from top and bottom (see FIG. 3), such that as these pads withdraw a slight roll is induced to the green tire, and it proceeds to roll downward along tracks 470. The tracks lead to a collection area (not shown) from which the green tires are taken to be later vulcanized.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A mechanism for unloading an assembled green tire from a tire building drum, comprising
    a pair of extensible transfer arms mounted extending in parallel spaced relation on opposite side of the rotational axis of the building drum and each having free ends projecting into radial spacing from the drum,
    means for moving said arms in synchronism from a rest position away from the drum to a pick-up position outward of a green tire on the drum and then to an unload position beyond the drum,
    a movable grip carried at each free end of each arm,
    means for extending said grips along generally opposed paths in an inward direction from said ends of said arms into engagement with the periphery of a green tire located on the drum,
    unloading track means located at the unload position of said arms and receiving green tires released from said grips at the unload position.

2. A mechanism as defined in claim 1, further comprising
    support means for said track means including means for moving said track means from a location to one side of said arms into a sloped receiving position beneath said arms whereby a green tire released by said grips will roll along said track means.

3. A mechanism for unloading an assembled tire from a tire building drum which is supported in cantilever fashion from a pedestal, comprising
    a pair of extensible transfer arms also mounted in cantilever fashion from the pedestal and extending in parallel spaced relation to and generally above and below the building drum, each arm having a free end projecting into radial spacing from the drum,
    means for moving said arms in synchronism from a rest position adjacent the pedestal and away from the drum to a pick-up position at which said ends are radially outward of a tire on the drum and then to an unload position beyond the drum and away from the pedestal, a movable grip carried at each free end of each arm, means for extending said grips along generally opposed paths in an inward direction from said ends of said arms into engagement with the periphery of a tire located on the drum, unloading track means located at the unload position of said arms and receiving rolling tires released from said grips at the unload position.

4. An apparatus as defined in claim 3, further comprising said grips being located to engage upper and lower areas about the periphery of the tire along a line which extends generally vertically of the tire and at an acute angle to vertical, the lower of said grips being displaced from a vertical line through the tire in a direction away from said track means, whereby upon release of the grips the tire is disposed to roll away from such lower grip in the direction of said track means.

5. An apparatus as defined in claim 4, comprising a sliding support means mounted to one side of the unload position and constructed and arranged to move said track means between an active position underneath a tire at the unload station, and an inactive position displaced outward to one side from beneath the unload station.

* * * * *